(12) United States Patent
Foscante et al.

(10) Patent No.: US 9,611,147 B2
(45) Date of Patent: Apr. 4, 2017

(54) ALUMINUM PHOSPHATES, COMPOSITIONS COMPRISING ALUMINUM PHOSPHATE, AND METHODS FOR MAKING THE SAME

(75) Inventors: Raymond E. Foscante, Yorba Linda, CA (US); Neil Maynard Johnson, Richmond Heights, OH (US); Yucel Burdurlu Tavolara, Strongsville, OH (US); Douglas Malcolm Harless, Belle Mead, NJ (US); Melanie Astrid Micha-Schama, Seven Hills, OH (US)

(73) Assignee: Bunge Amorphic Solutions LLC, White Plains, NY (US)

( * ) Notice: Subject to any disclaimer, the term of this patent is extended or adjusted under 35 U.S.C. 154(b) by 0 days.

(21) Appl. No.: 13/448,271

(22) Filed: Apr. 16, 2012

(65) Prior Publication Data

US 2013/0274400 A1    Oct. 17, 2013

(51) Int. Cl.
 *C01B 25/36*  (2006.01)
 *C09C 1/40*  (2006.01)

(52) U.S. Cl.
 CPC ............ *C01B 25/36* (2013.01); *C09C 1/40* (2013.01); *C01P 2006/12* (2013.01); *C01P 2006/19* (2013.01)

(58) Field of Classification Search
 CPC ....... C09C 1/40; C01B 25/36; C01P 2006/12; C01P 2006/19
 USPC .................... 423/305, 311–313, 308, 309
 See application file for complete search history.

(56) References Cited

U.S. PATENT DOCUMENTS

| | | |
|---|---|---|
| 1,654,404 A | 12/1927 | Blumenberg, Jr. |
| 3,394,987 A | 7/1968 | Lee et al. |
| 3,650,683 A | 3/1972 | Hloch et al. |
| 3,801,704 A | 4/1974 | Kobayashi et al. |
| 3,926,905 A | 12/1975 | Nose et al. |
| 3,943,231 A | 3/1976 | Wasel-Nielen et al. |
| 4,015,050 A | 3/1977 | Birchall et al. |
| 4,054,678 A | 10/1977 | Benjamin et al. |
| 4,076,221 A | 2/1978 | Groger |
| 4,078,028 A | 3/1978 | Kishi |
| 4,098,749 A | 7/1978 | Hoshino et al. |
| 4,111,884 A | 9/1978 | Takase et al. |
| 4,122,231 A | 10/1978 | Kishi |
| 4,127,157 A | 11/1978 | Gardikes et al. |
| 4,138,261 A | 2/1979 | Adrian et al. |
| 4,147,758 A | 4/1979 | Adrian et al. |
| 4,169,802 A | 10/1979 | Basile et al. |
| 4,171,984 A | 10/1979 | Hosaka et al. |
| 4,216,190 A | 8/1980 | Neely, Jr. |
| 4,227,932 A | 10/1980 | Leah et al. |
| 4,260,591 A | 4/1981 | Benjamin et al. |
| 4,319,926 A | 3/1982 | Nowakowski et al. |
| 4,321,244 A | 3/1982 | Magnier et al. |
| 4,328,033 A | 5/1982 | Boberski et al. |
| 4,329,327 A | 5/1982 | Neely, Jr. et al. |
| 4,333,914 A | 6/1982 | Neely, Jr. et al. |
| 4,364,854 A | 12/1982 | McDaniel et al. |
| 4,364,855 A | 12/1982 | McDaniel et al. |
| 4,375,496 A | 3/1983 | Nowakowski et al. |
| 4,383,866 A | 5/1983 | Nowakowski et al. |
| 4,395,387 A | 7/1983 | Goltz et al. |
| 4,418,048 A | 11/1983 | Dyer et al. |
| 4,435,219 A | 3/1984 | Greigger |
| 4,444,962 A | 4/1984 | McDaniel et al. |
| 4,444,965 A | 4/1984 | McDaniels et al. |
| 4,482,380 A | 11/1984 | Schlegel |
| 4,487,862 A | 12/1984 | Maruya |
| 4,505,954 A | 3/1985 | Hokamura et al. |
| 4,518,513 A | 5/1985 | Lochner et al. |
| 4,542,001 A | 9/1985 | Iino et al. |
| 4,547,479 A | 10/1985 | Johnson et al. |
| 4,567,152 A | 1/1986 | Pine |
| 4,597,796 A | 7/1986 | Ernst et al. |
| 4,622,371 A | 11/1986 | McDaniel |
| 4,640,964 A | 2/1987 | Johnson et al. |
| 4,673,663 A | 6/1987 | Magnier |
| 4,717,701 A | 1/1988 | McDaniel |
| 4,743,572 A | 5/1988 | Angevine et al. |
| 4,746,568 A | 5/1988 | Matsumoto et al. |
| 4,758,281 A | 7/1988 | Eckler et al. |
| 4,767,802 A | 8/1988 | Sakakibara et al. |
| 4,782,109 A | 11/1988 | DuLaney et al. |
| 4,833,576 A * | 5/1989 | Mers et al. .............. 362/640 |

(Continued)

FOREIGN PATENT DOCUMENTS

| | | |
|---|---|---|
| BR | 9104581 A | 4/1993 |
| BR | 9400746 A | 10/1995 |

(Continued)

OTHER PUBLICATIONS

Raj, Gurdeep, "Advanced Physical Chemistry" 2009, Krishna Prakashan Media, 35th Edition, pp. 217-220.*

(Continued)

*Primary Examiner* — Anthony J Zimmer
(74) *Attorney, Agent, or Firm* — Snell & Wilmer L.L.P.

(57) ABSTRACT

APs are made by binary condensation via base-to-acid or acid-to-base routes. In the base-to-acid route, an aluminum hydroxide slurry is added to phosphoric acid that reacts to produce an aluminum phosphate condensate. In the acid-to-base route, phosphoric acid is added to an aluminum hydroxide slurry that reacts to produce an aluminum phosphate condensate. In an alternative base-to-acid route, an acidic aluminum phosphate is first made by adding phosphoric acid to a first amount of aluminum hydroxide slurry, and such acidic aluminum phosphate is added to a remaining amount of aluminum hydroxide slurry to react and produce an aluminum phosphate condensate. The reactions can be controlled to form an in-situ layered aluminum phosphate. So-formed APs can be amorphous, crystalline, or a combination thereof, and have low oil absorption and surface area, making them particularly useful in such end-use applications as extender pigments in coating compositions, replacing up to 70 wt % of $TiO_2$.

45 Claims, No Drawings

(56) References Cited

U.S. PATENT DOCUMENTS

| | | | |
|---|---|---|---|
| 4,876,097 A | 10/1989 | Autant et al. | |
| 4,888,056 A | 12/1989 | van der Kolk et al. | |
| 4,898,660 A | 2/1990 | Wilson et al. | |
| 4,972,002 A | 11/1990 | Volkert | |
| 4,990,217 A | 2/1991 | Philippot et al. | |
| 4,996,103 A | 2/1991 | Henn et al. | |
| 5,028,684 A | 7/1991 | Neuhaus et al. | |
| 5,077,332 A | 12/1991 | Blattler et al. | |
| 5,096,933 A | 3/1992 | Volkert | |
| 5,108,755 A | 4/1992 | Daniels et al. | |
| 5,158,610 A * | 10/1992 | Bittner | 106/462 |
| 5,183,656 A | 2/1993 | Uesaka et al. | |
| 5,208,271 A | 5/1993 | Gallagher | |
| 5,242,744 A | 9/1993 | Schryer | |
| 5,256,253 A | 10/1993 | Zidovec et al. | |
| 5,296,027 A | 3/1994 | Ernst et al. | |
| 5,374,411 A | 12/1994 | Davis et al. | |
| 5,403,519 A | 4/1995 | Rittler | |
| 5,486,232 A | 1/1996 | Griffith et al. | |
| 5,488,016 A | 1/1996 | Rittler | |
| 5,496,529 A | 3/1996 | Fogel et al. | |
| 5,534,130 A | 7/1996 | Sekhar | |
| 5,698,758 A | 12/1997 | Rieser et al. | |
| 5,707,442 A | 1/1998 | Fogel et al. | |
| 5,763,015 A | 6/1998 | Hasui et al. | |
| 5,783,510 A | 7/1998 | Kida et al. | |
| 5,883,200 A | 3/1999 | Tsuchiya et al. | |
| 6,002,513 A | 12/1999 | Goossen et al. | |
| 6,010,563 A | 1/2000 | Taketani et al. | |
| 6,022,513 A | 2/2000 | Pecoraro et al. | |
| 6,117,373 A | 9/2000 | Kida et al. | |
| 6,139,616 A | 10/2000 | Nagayama et al. | |
| 6,177,489 B1 | 1/2001 | Okuse et al. | |
| 6,258,742 B1 * | 7/2001 | Carini | B22D 11/0405 501/127 |
| 6,316,532 B1 | 11/2001 | Nozaki et al. | |
| 6,342,546 B1 | 1/2002 | Kato et al. | |
| 6,409,951 B1 | 6/2002 | Inoue et al. | |
| 6,447,741 B1 | 9/2002 | Chester et al. | |
| 6,461,415 B1 | 10/2002 | Sambasivan et al. | |
| 6,503,304 B2 | 1/2003 | Korn et al. | |
| 6,547,870 B1 | 4/2003 | Griessmann et al. | |
| 6,562,474 B1 | 5/2003 | Yoshimi et al. | |
| 6,589,324 B2 | 7/2003 | Kamo et al. | |
| 6,635,192 B1 | 10/2003 | Schwarz | |
| 6,646,058 B1 | 11/2003 | Koger | |
| 6,669,816 B1 | 12/2003 | Poch et al. | |
| 6,677,053 B2 | 1/2004 | Yamaji et al. | |
| 6,749,769 B2 | 6/2004 | Gai | |
| 6,784,236 B2 | 8/2004 | Sugita et al. | |
| 6,797,155 B1 | 9/2004 | Chester et al. | |
| 6,838,506 B2 | 1/2005 | Nakao et al. | |
| 6,881,782 B2 | 4/2005 | Crater et al. | |
| 7,101,820 B2 | 9/2006 | Gai | |
| 7,311,944 B2 | 12/2007 | Sambasivan et al. | |
| 7,438,881 B2 * | 10/2008 | Staffel et al. | 423/311 |
| 2001/0031316 A1 | 10/2001 | Nozaki et al. | |
| 2002/0031679 A1 | 3/2002 | Yano et al. | |
| 2002/0040557 A1 | 4/2002 | Felton | |
| 2002/0158230 A1 | 10/2002 | Bortnik | |
| 2003/0113486 A1 | 6/2003 | Sakai et al. | |
| 2003/0138673 A1 | 7/2003 | Sambasivan et al. | |
| 2004/0011245 A1 | 1/2004 | Sambasivan et al. | |
| 2004/0063815 A1 | 4/2004 | Kinose et al. | |
| 2004/0071887 A1 | 4/2004 | Newton | |
| 2004/0092637 A1 | 5/2004 | McClanahan | |
| 2004/0138058 A1 | 7/2004 | Sambasivan et al. | |
| 2004/0261909 A1 | 12/2004 | Hamada | |
| 2005/0106384 A1 | 5/2005 | Sambasivan et al. | |
| 2006/0045831 A1 | 3/2006 | Galembeck et al. | |
| 2006/0057407 A1 | 3/2006 | Sambasivan et al. | |
| 2006/0211798 A1 | 9/2006 | Galembeck et al. | |
| 2007/0272117 A1 * | 11/2007 | Staffel | C01B 25/36 106/14.12 |
| 2008/0038556 A1 * | 2/2008 | Galembeck et al. | 428/402 |
| 2008/0085965 A1 | 4/2008 | Imakita et al. | |
| 2009/0064893 A1 | 3/2009 | Sambasivan et al. | |
| 2009/0149317 A1 | 6/2009 | Stamires et al. | |
| 2009/0217841 A1 | 9/2009 | Galembeck et al. | |
| 2010/0180801 A1 * | 7/2010 | Thauern et al. | 106/443 |
| 2010/0203318 A1 | 8/2010 | Galembeck et al. | |
| 2012/0091397 A1 * | 4/2012 | Foscante | 252/389.2 |
| 2012/0094128 A1 | 4/2012 | Foscante | |
| 2012/0094130 A1 | 4/2012 | Foscante et al. | |

FOREIGN PATENT DOCUMENTS

| | | |
|---|---|---|
| BR | 9500522 A | 3/1997 |
| EP | 0492137 | 7/1992 |
| EP | 0598464 A1 | 5/1994 |
| EP | 0837031 A2 | 4/1998 |
| EP | 1241131 A1 | 9/2002 |
| EP | 1807475 | 7/2007 |
| FR | 2157866 A1 | 6/1973 |
| GB | 1403242 A | 8/1975 |
| GB | 2038791 A | 7/1980 |
| JP | 53019345 A | 2/1978 |
| JP | 53059725 A | 5/1978 |
| JP | 55160059 A | 12/1980 |
| JP | 56032553 A | 4/1981 |
| JP | 56032554 A | 4/1981 |
| JP | 56032555 A | 4/1981 |
| JP | 56032556 A | 4/1981 |
| JP | 56131671 A | 10/1981 |
| JP | 57158267 A | 9/1982 |
| JP | 60215091 A | 10/1985 |
| JP | 61101566 A | 5/1986 |
| JP | 61286209 A | 12/1986 |
| JP | 62004753 A | 1/1987 |
| JP | 63101454 A | 5/1988 |
| JP | 1110567 A | 4/1989 |
| JP | 1167381 A | 7/1989 |
| JP | 1234475 A | 9/1989 |
| JP | 1249683 A | 10/1989 |
| JP | 4090874 A | 3/1992 |
| JP | 6179866 A | 6/1994 |
| JP | 6286054 A | 10/1994 |
| JP | 7241954 A | 9/1995 |
| JP | 7330451 A | 12/1995 |
| JP | 8072197 A | 3/1996 |
| JP | 8268704 A | 10/1996 |
| JP | 8283619 A | 10/1996 |
| JP | 10139923 A | 5/1998 |
| JP | 10-213374 A | 8/1998 |
| JP | 10235782 A | 9/1998 |
| JP | 11047261 A | 2/1999 |
| JP | 2001089127 A | 4/2001 |
| JP | 2001329221 A | 11/2001 |
| WO | WO-2006024959 A2 | 3/2006 |

OTHER PUBLICATIONS

Faison et al.; Use of Polyphosphates as Deflocculants of Alumina; Ceramic Engineering & Science Proceedings; vol. 12[1-2]; 1991; pp. 106-115.

Beppu, M.M., Lima, E. C.O., and Galembeck, F., Aluminum Phosphate Particles Containing Closed Pores: Preparation, Characterization, and Use as a White Pigment, Journal of Colloid and Interface Science 178, 93-103 (1996), Article No. 0097.

Beppu, M. M., Lima, E. C. O., Sassaki, R.M., and Galembeck, F., Self-Opacifying Aluminum Phosphate Particles for Paint Film Pigmentation, Journal of Coatings Technology, vol. 69, No. 867, 81-88, Apr. 1997.

Lima, E. C. O., Beppu, M. M., Galembeck, F., Filho, J. F. V., and Soares, D. M., Non-Crystalline Aluminum Polyphosphates: Preparation and Properties, J. Braz. Chem. Soc., vol. 7, No. 3, 2009-215, 1996, printed in Brazil.

Souza, E. F., and Galembeck, F., Formation of Opaque Films by Biomimetic Process, Journal of Material Science 32 (1997) 2207-2213.

(56) References Cited

OTHER PUBLICATIONS

Souza, E.F., Silva, M. D. C., and Galembeck, F., Improved Latex Film—Glass Adhesion Under Wet Enviroments by Using and Aluminum Polyphosphate Filler, [publication], 358-377 (1998).

Lima, E. C. O., Beppu, M. M., and Galembeck, F., Nanosized Particles of Aluminum Polyphosphate, Langmuir, vol. 12, No. 7, pp. 1701-1703.

Monteiro, V. A. R., Souza, E. F., Azevedo, M. M. M., and Galembeck, F., Aluminum Polyphosphate Nanoparticles: Preparation, Particle Size Determination, and Microchemistry, Journal of Colloid and Interface Science 217, 237-248 (1999), Article ID jcis.1999.6381, http://www.idealibrary.com.

Burrell, L. S., Johnston, C.T., Schulze, D. Klein, J. White, J. L. and Hem, S. L., Aluminium Phosphate Adjuvants Prepared by Precipitation at Constant pH. Part I: Compositon and Structure, Vaccine 19 (2001) 275-281.

Burrell, L. S., Johnston, C.T., Schulze, D. Klein, J. White, J. L. and Hem, S. L., Aluminium Phosphate Adjuvants Prepared by Precipitation at Constant pH. Part II: Physicochemcial Properties, Vaccine 19 (2001) 282-287.

Yang, H., Walton, R. I., Biedasek, S., Antonijevic, S., and Wimperis, S., Experimental Observations of Water—Framework Interactions in a Hydrated Microporous Aluminum Phosphate, J. Phys. Chem. B. 2005, 109, 4464-4469.

Filho, P.P.A., and Galembeck, F., Genesis of a Solid Foam: Iron (III) Metaphosphate Transofrmation in Sol-Gel Crystallization Processes, Langmuir 1990, 6, 1013-1016.

Lima, E. C. O., and Galembeck, F., Particles of Aluminum Metalphosphate Containing Closed Pores. Preparation, Characterization and Optical Properties, Colloids and Surfaces A: Physicochemical and Engineering Aspects, 75 (1993) 65-74.

White Pigment prodn.—by mixing aq. Solns. of metal phosphate, sodium phosphate and ammonium hydroxide, drying the ppte., milling, sievning and igniting: DERWENT; 1993; XP002368265; abstract.

Rosetto R et al.; Hydrous non-crystalline phosphates: structure, function and a new white pigment; J. Braz. Chem. Soc., Sao Paulo, BR; vol. 17, No. 8; Jun. 2006; pp. 1465-1472; XP002432072; ISSN: 0103-5053.

International Search Report mailed on Dec. 20, 2013 for PCT/US2013/035770, 7 pages.

Written Opinion of the International Searching Authority dated Dec. 20, 2013 for corresponding International Application No. PCT/US2013/035770 filed Apr. 9, 2013; total 11 pages.

International Preliminary Report on Patentability dated Sep. 23, 2014 for corresponding International Application No. PCT/US2013/035770 filed Apr. 9, 2013; total 18 pages.

\* cited by examiner

ALUMINUM PHOSPHATES, COMPOSITIONS COMPRISING ALUMINUM PHOSPHATE, AND METHODS FOR MAKING THE SAME

FIELD OF THE INVENTION

The invention disclosed herein relates to aluminum phosphates, compositions comprising aluminum phosphate, and methods of making aluminum phosphate and such compositions and, more particularly, to aluminum phosphates, compositions, and methods useful for making aluminum phosphates in amorphous and/or crystalline form for a variety of end-use applications, wherein such methods have reduced or eliminated levels of unwanted byproducts, produce aluminum phosphates having desired performance properties, and wherein such methods are more economical as compared to conventional methods for forming aluminum phosphates.

BACKGROUND OF THE INVENTION

Aluminum phosphates are known in the art and used for a variety of end-use applications. Conventional methods known in the art for making the same typically involve combining an aluminum source, such as an aluminum salt, with a phosphorus source, such as phosphoric acid and reacting the two to produce an aluminum phosphate (AP) precipitate or condensate. The AP is filtered, washed and dried to produce a powder. The resulting AP powder can be used in a variety of applications, such as in coatings or in composite constructions to provide desired performance properties.

While such conventional methods known in the art are effective for making AP, such methods are known to produce unwanted byproducts that may operate to impair a desired performance property of the AP alone or in a composition or composite, and/or may not be desired from a health, safety or environmental perspective. Additionally, conventional methods known for making AP do not enable production of AP particles and compositions having certain desired characteristics and/or performance properties, thereby effectively limiting the ability of such produced APs to be placed into certain end-use applications calling for specific AP properties and/or characteristics.

It is, therefore, desired that methods for making APs be developed that enable APs to be made in the manner that minimizes or eliminates the formation of unwanted byproducts that can either impair the performance of the APs or compositions containing the same, or that may create unwanted health, safety or environmental issues. It is further desired that such methods for making APs enables one to specially engineer AP particles and compositions having certain desired characteristics and/or performance properties not otherwise obtainable using conventional methods of making, to enable the use of such formed APs in a greater variety of end-use applications. Further, it is desired that such methods enable forming APs in a manner that is relatively more cost effective and/or efficient as compared to the conventional methods of forming APs.

SUMMARY OF THE INVENTION

APs as disclosed herein are made according to a number of different binary condensation techniques. In one example embodiment, APs can be made by a base-to-acid route wherein aluminum hydroxide slurry is added to phosphoric acid in a controlled fashion to form a mixture that undergoes reaction at an elevated temperature to produce a reaction product comprising aluminum phosphate condensate in the reaction product.

In another example embodiment, APs can be made by an acid-to-base route wherein phosphoric acid is added in a controlled fashion to aluminum hydroxide slurry to form a mixture, and the mixture undergoes reaction at elevated temperature to produce a reaction product comprising an aluminum phosphate condensate.

In an alternative acid-to-base route, a first portion of the aluminum hydroxide slurry (e.g., comprising about ⅓ of the total amount of the aluminum hydroxide) is combined with phosphoric acid to form an acidic aluminum phosphate solution, and then adding the so-formed acidic aluminum phosphate solution with a second portion of the aluminum hydroxide slurry (e.g., comprising the remaining ⅔rds of the total amount of the aluminum hydroxide) form a mixture. The mixture undergoes reaction at an elevated temperature to form a reaction product comprising aluminum phosphate condensate in solution.

The APs made according to the methods disclosed above can be reacted under conditions of constant volume or under conditions of variable volume. When reacted under conditions of variable volume, moisture is allowed to escape during reaction and water is added at certain intervals to produce in-situ AP particle layering, e.g., wherein initially reacted AP particles are formed and subsequently formed AP particles are layered or deposited on the earlier-formed AP particles.

The aluminum phosphate condensates formed according to the methods disclosed are separated from the reaction product by conventional means such as by filtering and the like, are rinsed, and are dried to form AP particles. The so-formed AP particles can have the form of amorphous AP, crystalline AP, or a combination of amorphous and crystalline AP depending on the particular method conditions and desired end-use characteristics and properties as called for by the particular end-use application.

APs made according to the methods disclosed above are characterized by having relatively low oil absorption and low surface area. In an example embodiment, APs as formed herein have an oil absorption of less than about 50, and have a surface area of less than about 20 $m^2/g$, making them uniquely useful as a extender pigment for coating composition applications. In such coating compositions, the AP is used to replace an amount, e.g., up to about 70 wt %, of a conventional pigment agent such as titanium dioxide or the like, and wherein the AP and conventional pigment agent are dispersed in a binding polymer thereby forming the coating composition.

APs made in accordance with the methods disclosed herein enables one to specially engineer AP particles and compositions formed therefrom to have certain desired characteristics and/or performance properties not otherwise obtainable using conventional methods of making, thereby enabling the use APs in a greater variety of end-use applications. Further, the methods disclosed herein enable making APs in a manner that is relatively more cost effective and/or efficient as compared to the conventional methods of forming APs.

DETAILED DESCRIPTION OF INVENTION

Aluminum phosphates (APs) and compositions comprising the same, as made according to the methods disclosed herein may be used in a number of different end-use applications, e.g., as pigments, fillers, and other additives that may or may not have a particular characteristic or functionality. Example pigments include those useful in coating compositions and/or composite compositions, such as opacifying pigments that may be used alone or with other pigment materials, as an extender pigment for titanium dioxide or the like. Additionally, APs made as described herein can be used with further treatment and/or processing to function as an inhibitive pigment to provide a desired degree of corrosion resistance to a formulation or composition. Additionally, such APs can be used as a raw material, an intermediate, or as ingredient in developing and forming chemical compositions, chemical composites or the like.

While the methods disclosed herein for making APs may reference and disclose the formation of amorphous aluminum phosphate (AAP), it is to be understood that such methods may also be used or adapted for making other forms of AP, such as the various crystalline aluminum phosphate forms and/or mixtures of amorphous and crystalline aluminum phosphates, depending on the particular end-use applications and/or desired end-use application performance properties. Example crystalline forms of AP formed as disclosed herein include and are not limited to orthorhombic and triclinic aluminum orthophosphates. Accordingly, the methods disclosed herein are understood to be useful for making different forms of AP, depending on the particular end-use applications and performance properties.

Example methods as disclosed herein comprise forming AP by a condensation process, wherein the AP is formed by the condensation reaction of an aluminum containing ingredient with a phosphorous-containing ingredient to produce AP particles in slurry form. In one example embodiment, a preferred source of the aluminum-containing ingredient is aluminum hydroxide ($Al(OH)_3$), and the preferred source of the phosphorus-containing ingredient is phosphoric acid ($H_3PO_4$).

The following examples are provided for purposes of reference with respect to different improved methods for making AP as disclosed herein:

Example No. 1

Binary Condensation of AP (Base-to-Acid Route)

In an example embodiment, AP is prepared by combining phosphoric acid ($H_3PO_4$) with aluminum hydroxide ($Al(OH)_3$). The $H_3PO_4$ was diluted with water before being combined with the $Al(OH)_3$ and, prior to addition, the $Al(OH)_3$ was not wetted with water, although wetted $Al(OH)_3$ can be used. The reactants were quickly combined at room temperature without heating to produce a white slurry. However, if desired, the reaction can be heated. The $H_3PO_4$ was 85 wt % in water provided by Sigma-Aldrich, and the $Al(OH)_3$ was reagent grade provided by Sigma-Aldrich. Specifically, approximately 57.3 g (0.5 mole) $H_3PO_4$ was diluted with 50 g of water before being combined with $Al(OH)_3$. Approximately 39 g (0.5 mole) of $Al(OH)_3$ was added to the solution quickly and the mixture was stirred slowly at room temperature to wet the powder. An AP condensed solid was formed and existed as a dispersion of solid AP particles in water. In this particular embodiment, the AP particles existed primarily in the form of amorphous aluminum phosphate (AAP). Diluting the $H_3PO_4$ prior to addition of the $Al(OH)_3$ is believed to contribute to forming exclusively AAP, e.g., wherein there is no crystalline form produced. The suspension was filtered to isolate the AAP particles. The particles were washed and dried to an appropriate temperature, which may be less than about 300° C., and preferably from about 100° C. to 200° C. A feature of the AP so formed is that it may be combined with a binding polymer, e.g., when the end-use application is a chemical composition or a coating composition, without the need for further heat treatment, tempering, or calcining. While heating the AAP at the extreme temperatures noted above may be useful for driving off water, such may also initiate conversion of the AP from an amorphous form to a crystalline form. It may be desired to subject the AP to elevated temperatures above 200° C., e.g., of between 300° C. to 800° C., to either remove unwanted constituents therefrom and/or to influence physical characteristics of the AP that may influence its end-use performance or characteristics in the chemical composition. If a crystalline form of AP is desired, the AP so formed can be further heat treated or calcined to produce the desired crystalline AP.

Alternatively, the AP was prepared by combining $H_3PO_4$ with $Al(OH)_3$. Unlike the above example embodiment, the $H_3PO_4$ was not diluted before being added to the $Al(OH)_3$. However, before combining, the $H_3PO_4$ was heated. Additionally, prior to combining with the $H_3PO_4$, the $Al(OH)_3$ was wetted with water. A feature of this method of preparing is that it does not include the addition of free water after combination of the reactants, although it is to be understood that the AP can be made according to this method by including the addition of free water. In an example embodiment, the $H_3PO_4$ was 85 wt % in water provided by Sigma-Aldrich, and the $Al(OH)_3$ was reagent grade provided by Sigma-Aldrich. Specifically, approximately 57.6 g $H_3PO_4$ was heated to a temperature of about 80° C. Approximately 39 g of $Al(OH)_3$ was wetted with about 2 g water and the wetted $Al(OH)_3$ was quickly added to the $H_3PO_4$ under fast mechanical stirring. An AAP solid was formed and existed as a dough-like ball that was removed and stored at room temperature. A feature of the AP so formed is that further treatment in the form of filtering and washing was not necessary to isolate and obtain the desired AP. As disclosed above, such AP was dried and formed into the desired particle size for a desired end-use application.

Example No. 2

Binary Condensation of AP (Base-to-Acid Route)

In an example embodiment, AP is prepared by combining phosphoric acid ($H_3PO_4$) with aluminum hydroxide ($Al(OH)_3$), wherein the $Al(OH)_3$ is a slurry and is held at an elevated temperature, e.g., at about 60° C., and is subsequently reacted with phosphoric acid solution to form the desired AP. The $H_3PO_4$ was diluted with water before being combined with the $Al(OH)_3$ and, prior to addition, the $Al(OH)_3$ was combined with water to form a slurry comprising approximately between about 10 and 25%, and in some cases up to about 40 percent by weight by weight $Al(OH)_3$, depending on the grade of $Al(OH)_3$. In preparing the $Al(OH)_3$ slurry, the water may be heated to facilitate dispersion of the aluminum hydroxide powder, e.g., to overcome certain properties of a specific grade of aluminum hydroxide. The heated slurry may be maintained at an elevated temperature and added to the acid. With very high-grade aluminum hydroxide, having a high degree of purity and small particle size and distribution, the $Al(OH)_3$ slurry can be made by adding to room temperature water.

The $Al(OH)_3$ slurry was added slowly to the diluted $H_3PO_4$ for the purpose of controlling the kinetics of the condensation reaction. In an example embodiment, the $Al(OH)_3$ slurry was added in a controlled manner, e.g., in a drop-wise fashion or the like, to the $H_3PO_4$ over a period of approximately 10 minutes to about one hour. The combined reactants were heated to a temperature of approximately 95° C., and the reactants were mixed together for a sufficient period of time, typically about 3 hours. In an example embodiment, the reaction takes place in a constant volume system that is essentially closed, e.g., a reflux condenser may be attached to maintain constant solvent volume (water) in the reaction system. In an example embodiment, the $H_3PO_4$ was 85 wt % in water provided by Sigma-Aldrich, and the $Al(OH)_3$ was reagent grade, provided by Sigma-Aldrich. Specifically, approximately 864 g of 85% dilute $H_3PO_4$ was used, and the slurry was formed by combining 585 g of $Al(OH)_3$ with 1,650 g of deionized water. The combined reactants were contained in a mixing vessel and mixed at 1,300 to 1,500 rpms. Further water was added to the reactants and the combination was mixed for approximately 30 minutes to about 3 hours, e.g., more typically the latter.

If desired, a suitable chemical agent can be added to the reactants for the purpose of reducing the solubility of the components of the mother liquor, thereby providing still further increased control over the outcome of the reaction. In an example embodiment, such chemical agent can be calcium hydroxide $(Ca(OH)_2)$, soluble amines such as diethylenetriamine (DETA), or the like.

An AAP condensed solid was formed and existed as a dispersion of solid acidic AAP particles in water. The suspension was filtered to isolate the acidic AP particles. The particles were washed with water one or more times, and then filtered again. In an example embodiment, after the initial filtering, the particles were washed with a volume of water approximately six times the volume of the precipitate before being refiltered. Successive washings operate to remove unreacted starting material and any soluble byproducts from production. After being refiltered, the acidic AP particles were reslurried by the addition of water, and were further treated in accordance with one of the following three different techniques.

In a first technique, the slurry is filtered to isolate the acidic AP particles and the particles are heated. In an example embodiment, the AP particles are heated to a temperature of about 110° C. for about 24 hours to drive off the water, and produce acidic AP particles. Alternatively, the AP particles are heated to a temperature of about 250° C. for about 12 to 48 hours, and produce acidic AP particles that are both free of water and any by-products that decompose below 250° C. In addition, heat treatment at either temperature, but especially at the elevated temperature, provides the driving force to complete the conversion of any intermediates that may remain in the complex.

In a second technique, the slurry containing the acidic AP is neutralized by adding a suitable neutralizing agent thereto. In an example embodiment, the neutralizing agent is ammonium hydroxide $(NH_4OH)$ that is added to the slurry in a sufficient amount to increase the pH and to neutralize the AP to a desired pH, typically 5.5 to 7.0. The resulting slurry is filtered and the isolated AP particles are heated. In one example embodiment, the AP particles are heated to a temperature of about 110° C. for about 24 hours to drive off the water, and produce AP particles. Alternatively, the AP particles are heated to a temperature of about 250° C. for about 24 hours to both drive off water and other unwanted chemical constituents, to produce AP particles and to effect any final conversion or neutralization of surface adsorbed or bulk absorbed reactive species such as phosphate anion or hydrogen phosphate anion. Any reactive amine may be used for this conversion or neutralization step, including but not limited to diethylenetriamine, triethylenetetramine, 2-amino-2-methyl-1-propanol.

In a third technique, the slurry containing the acidic AP is neutralized by adding a suitable neutralizing agent thereto. In an example embodiment, the neutralizing agent is calcium hydroxide $(Ca(OH)_2)$ that is added to the slurry in a sufficient amount to increase the pH and neutralize the acidic AP. The resulting slurry is filtered and the isolated AAP particles are heated. In one example embodiment, the AP particles are heated to a temperature of about 110° C. for about 24 hours to drive off the water, and produce AP particles. Alternatively, the AP particles are heated to a temperature of about 250° C. for about 24 hours to both drive off water and other unwanted chemical constituents, and produce AP particles. Other hydroxide compounds of such divalent cations as barium, and magnesium may be used in place of calcium to effect the neutralization or pH adjustment.

As described above in Example 1, all of the AP according to the methods disclosed in Example 2 can be treated to provide crystalline AP or combinations of AAP and crystalline AP, e.g., by running the condensation reaction at temperatures for periods of time of less than 3 hours above 90° C. depending on the particular end-use application. Maintaining the reaction temperature between about 45 and 90° C., and preferably between about 60 and 70° C. will produce AP that is a combination of crystalline and amorphous forms. Running the reaction at a temperature below about 45° C. will produce primarily AP in the amorphous form.

Example No. 3

Binary Condensation of AP (Acid-to-Base Route)

It has been discovered that changing the order of addition changes the nature of the catalysis of the condensation reaction, i.e., adding the acid to the basic slurry results in slower localized pH change and the reaction is primarily base catalyzed. The AP particles form slower and are smaller in localized areas in solution. The particles that form tend to have higher surface areas than particles formed by acid catalysis, and are less aggregated and agglomerated. In an example embodiment, the order of addition in Example 2 is reversed, that is, the required amount of phosphoric acid is added slowly to the aluminum hydroxide slurry. The slurry is prepared as described in Example 2. Phosphoric acid is added slowly to the slurry over a period of approximately 30 minutes to one hour, and the resulting mixture is mechanically stirred and heated to about 95° C. for at least 3 hours. The AP particles are isolated and purified, and dried as described in Example 2.

In addition to the acid-to-base route disclosed immediately above, it has been discovered that such acid-to-base route can be further enhanced by first dissolving a certain amount of the aluminum hydroxide in the phosphoric acid before adding the acid solution to the slurry. In an example embodiment, an amount of aluminum hydroxide, e.g., up to the solubility limit of aluminum hydroxide, is dissolved separately in the phosphoric acid. In an example embodiment, AP is prepared according to a two-step process. In a first step, a portion of the aluminum hydroxide, typically one third of the stoichiometric amount, is first dissolved in phosphoric acid to form an acidic AP solution. This acidic AP solution contains all the phosphoric acid and phosphate needed to satisfy the stoichiometry of the reaction for a product having the desired 1:1 P to Al ratio. In a second step, the acidic AP solution is then added to a slurry containing the remaining amount of aluminum hydroxide required for stoichiometry. The combination undergoes reaction at ambient temperature to form an AP condensed solid comprising a dispersion of solid acidic AAP particles in water. Alternatively, the reaction can occur at elevated temperature conditions, e.g., of about 95° C., which is preferred for reaction efficiency and kinetic control of product forms. An advantage of this two-step approach is that part of the aluminum hydroxide required for the reaction is dissolved and pre-reacted before the acid solution is added to the slurry, thereby providing a subsequent heterogeneous reaction that is less viscous and requires less agitation, to thereby ensure more complete condensation.

Like the method disclosed in Example 2 above, such acid-to-base reaction routes are ones that are preferably conducted under constant volume conditions. The suspension was filtered to isolate the acidic AP particles. The particles were washed with water one or more times, and then filtered again. In an example embodiment, after the initial filtering, the particles were washed with a volume of water approximately six times the volume of the precipitate before being refiltered. In a preferred embodiment, the sequence is to filter and wash, which can be repeated any number of times to achieve the desired degree of purity. The resulting rewashed AP particles can then be filtered and dried at a temperature of approximately 110° C. for about 24 hours to provide acidic AP particles.

Alternatively, after rewashing, the AP particles can be reslurried and then neutralized by adding a suitable neutralizing agent, e.g., such as those described above, thereto. In an example embodiment, a sufficient quantity of ammonium hydroxide ($NH_4OH$) was added to the reslurried AP, and the resulting mixture was filtered to isolate the AP particles, and the particles are heated. In an example embodiment, the AP particles are heated to a temperature of about 110° C. for about 24 hours to drive off the water, and produce solid AAP particles. Additionally, as described above in Example 1, the AP made according to the methods disclosed in Example 3 can be treated to provide crystalline AP in place of or in combination with AAP, depending on the particular end-use applications, e.g., by running the reaction at temperatures in excess of about 90° C.

Example 4

Binary Condensation of AP (Base-to-Acid In-Situ Aggregation)

In an example embodiment, AP is prepared by adding aluminum hydroxide ($Al(OH)_3$) to phosphoric acid ($H_3PO_4$) to form the desired AP, e.g., in the manner disclosed above in Example 2. However, unlike Example 2, the reaction is allowed to occur in an open system, wherein the reaction system is left open so as to allow solvent water to continuously evaporate, thereby causing the concentration of the reaction system to increase and its pH to decrease over time. At periodic intervals during the condensation reaction process, the water level is replenished to the initial volume. The reaction slurry is then diluted with an additional 50 g of water and stirred for 30 minutes to further facilitate dispersion of the AP particles in the reaction slurry. The slurry is then filtered, washed with a volume of water approximately six times the volume of the precipitate, and filtered again. This filter-wash-filter cycle can be repeated until the desired purity level is achieved. Usually one to three cycles is sufficient to remove unreacted starting material and unwanted reaction by-products.

It has been discovered that by allowing the volume to vary as described, the resulting change in system concentration and pH causes sequential precipitation of AP "oligomers" in solution onto AP particles already formed and agglomerated. This sequential precipitation of AP oligomers onto already-formed and agglomerated AP particles operates to seal the surface porosity of the pre-existing AP aggregates and particles, e.g., causing in-situ particle layering, which thereby reduces the surface porosity of such AP aggregate and reduces such related properties as oil absorption. In an example embodiment, the AP oligomers are AAP and the AP particles already formed are AAP.

As noted above, allowing water levels to cycle during the condensation causes a change in the pH proportional to the concentration of the $Al(OH)_3$. When the volume decreases, the pH increases due to the higher concentration of the $Al(OH)_3$, and the solubility decreases allowing AP oligomers to agglomerate. Adding $Ca(OH)_2$ to the condensation medium may also effect a similar change in pH, causing the precipitation of AP and subsequent coating of pre-existing AP particles. This process would also incorporate the alkaline earth metal cations as counter-ions for residual acid phosphate groups either adsorbed on the AP particle surface or bonded as a pendant component.

A condensed solid was formed and existed as a dispersion of solid acidic coated AAP particles in water. The suspension was filtered to isolate the acidic coated AP particles. The particles were washed with water one or more times, and then filtered again. In an example embodiment, after the initial filtering the particles were washed with a volume of water approximately six times the volume of the precipitate before being refiltered. Successive washings remove unreacted starting material and any byproducts from production. After being refiltered, the acidic coated AP particles were reslurried by the addition of water, and were further heat treated. In an example embodiment, the slurry is filtered to isolate the acidic coated AP particles and the particles are heated to a temperature of about 110° C. for about 24 hours to drive off the water, and produce acidic coated AP particles. Alternatively, the coated AP particles are heated to a temperature of about 250° C. for about 12 to 48 hours, to produce dry acidic coated AP particles that are both free of water and any by-products that decompose below 250° C.

Example 5

Binary Condensation of AP (Acid-to-Base In-Situ Aggregation)

In an example embodiment, AP is prepared by adding phosphoric acid ($H_3PO_4$) to aluminum hydroxide ($Al(OH)_3$) to form the desired AP, e.g., in the manner disclosed above in Example 3. However, unlike Example 3, the reaction is allowed to occur in an open system, wherein the reaction system is left open so as to allow solvent water to continuously evaporate, thereby causing the concentration of the reaction system to increase and its pH to decrease over time. At periodic intervals during the condensation reaction process, the water level is replenished to the initial volume. The reaction slurry is then diluted with an additional 50 g of water and stirred for 30 minutes to further facilitate dispersion of the AP particles in the reaction slurry. The slurry is then filtered, washed with a volume of water approximately six times the volume of the precipitate, and filtered again. This filter-wash-filter cycle can be repeated until the desired purity level is achieved. Usually one to three cycles is sufficient to remove unreacted starting material and unwanted reaction by-products.

As noted above in Example 4, it has been discovered that by allowing the volume to vary as described during the reaction, the resulting change in system concentration and pH causes sequential precipitation of AP "oligomers" in solution onto AP particles already formed and agglomerated. This sequential precipitation of AP oligomers onto already-formed and agglomerated AP particles operates to seal the surface porosity of the pre-existing AP aggregates and particles, e.g., causing in-situ particle layering, which thereby reduces the surface porosity of such AP aggregate and reduces such related properties as oil absorption. In an example embodiment, the AP oligomers are AAP and the AP particles already formed are AAP.

Each of the improved methods for making AP as disclosed herein provides an advantage when compared to conventional methods of making AP, in that such improved methods do not produce unwanted byproducts, such as $(NH_4)_2HPO_4$, $NH_4H_2PO_4$, $NH_4NO_3$, $Ca_3(PO_4)_2$, $CaH_2PO_4$, $Ca_2HPO_4$, which byproducts can operate to impair one or more characteristics and/or performance features of the AP formed therefrom that can impair or interfere with the desired function of the AP in a coating or composite composition, and/or that can present unwanted health, safety or environmental issues. Additionally, each of the improved methods for making AP as disclosed herein provides a manner of making AP that is more cost effective from both a raw materials perspective and from a cost of processing perspective, as compared to conventional methods of making AP. Further, such improved methods provide a tool that allows one to formulate AP in a manner that enables a degree of control over the resulting characteristics of the AP, such as surface area, oil absorption, porosity and the like not otherwise available. Additionally, with further treatment and/or processing, APs as disclosed herein can provide performance properties such as phosphate anion and/or metal cation release or the like making them useful for certain anti-corrosion or other end-use applications.

APs made according to the methods disclosed herein can be formulated to have one or more properties or characteristics making them uniquely suited for particular end-use applications, wherein such end-use applications may include chemical compositions comprising the AP as an ingredient that provides a desired performance property, such as a component of an opacifying pigment composition or opacifying pigment extender. With further treatment and/or processing, such APs can be adapted for use in providing anticorrosion protection/control, antimicrobial protection/control, filler, or the like. APs as disclosed herein may be combined with other materials, wherein such combination can occur during, before or after the step of forming the AP by reaction to provide further performance features that may contribute to existing AP properties or characteristics, or that may provide properties additional to and not otherwise inherently present in the AP for purposes of meeting a specific end-use application. For example, APs made as disclosed herein and subjected to further treatment and/or processing may incorporate the presence of metal hydroxides such as those of zinc, magnesium, strontium, and calcium to provide a complex capable of providing an additional degree of passivation/inhibition from the secondary cation, which complex may be useful in certain end-use applications calling for corrosion resistance.

In an example embodiment, APs formed as disclosed herein are especially useful as extender pigments in coating compositions and paints. In modern paint chemistry, titanium dioxide is virtually the only prime white pigment used for opacification. The effectiveness of titanium dioxide as an opacifier is due to its high refractive index and, in a dry film, its efficiency at light scattering depends on the pigment volume concentration (PVC) of the paint and the packing (spacing) of the titanium dioxide particles in the film. If the particles are packed too closely optimal light scattering will not occur. Extender pigments are used to establish and control pigment volume and to provide, among other things, spacing between titanium dioxide particles to optimize light scattering. Depending on PVC, optimal light scattering for titanium dioxide occurs between 10 and 30% titanium dioxide PVC in the film. Hence, formula cost reduction (titanium dioxide is typically the most expensive component of an architectural paint formulation) and performance enhancement can be achieved by incorporating an extender pigment in the formulation.

APs made according to the methods disclosed herein have been shown to be an effective extender pigment for titanium dioxide in typical coatings and paint formulations. For example, in paints formulated below the CPVC (critical pigment volume concentration), APs may be used to replace (extend) up to about 40% by weight of the titanium dioxide pigment contained in the control composition. At this level, testing has shown that less than 1% reduction in opacity occurs compared to the unsubstituted titanium dioxide control.

An example water-based acrylic latex formulation is provided below. In this formula, the control contains approximately 240 lbs of titanium dioxide or 22.6 wt %. Approximately 96 lbs or 40 wt % of the titanium dioxide content in this formula can be replaced by a comparable amount of AP without significant compromise in opacity. While a water-based latex formulation is provided by way of example, it is to be understood that AP extender pigments as disclosed herein can also be used in conjunction with solvent-based formations.

| Water-based acrylic latex formulation | | | |
|---|---|---|---|
| | # | % | |
| Water | 281.0 | 26.6 | solvent |
| Natrosol plus | 2.0 | 0.2 | associative thickener |
| Drewplus L-475 | 3.8 | 0.4 | foam control agent |
| Ammonium hydroxide | 6.0 | 0.6 | pH control |
| Tamol 731 | 8.0 | 0.8 | pigment dispersant |
| Igepal CTA 639W | 4.0 | 0.4 | pigment dispersant |
| Tipure R706 | 240.0 | 22.6 | white pigment |
| Acrysol RM-825 | 10.0 | 1.0 | non-ionic surfactant |
| Acrysol RM-2020 NPR | 6.0 | 0.6 | non-ionic surfactant |
| Texanol ester alcohol | 20.0 | 2.0 | coalescing agent |
| Drewplus L-475 | 4.0 | 0.4 | foam control agent |
| UCAR 379G | 470.0 | 44.4 | vinyl-acrylic latex resin |
| | 1054.8 | 100.0 | |
| formula total volume | 100 gal | | |
| % weight solids | 49.1 | | |
| % volume solids | 35.9 | | |
| PVC | 21.20% | | |

Further it has been found that other advantages accrue to the AP as an extender pigment including: ease of incorporation into paint formulations using typical compounding procedures; excellent storage stability; good dispersion in typical paint compositions including acrylic latex based systems; good rheology (less thickener is required compared to other alternative extenders); excellent sheen control; excellent color development (superior to calcined clay, a typical extender); no interference with formula color acceptance; and improved film integrity (higher scrub resistance compared to other extenders).

As noted above, APs made as disclosed herein can be specifically engineered to have tailored properties and/or characteristics such as surface area and/or porosity to meet the desired needs of certain end-use applications. For example, APs formed as described herein can be provided in an amorphous form that is substantially free of closed voids or pores, and that has a relatively few open pores or has a relatively low surface area and/or porosity, e.g., has a relatively low oil absorption, making it ideally suited and compatible for use as an opacifying pigment component or extender pigment, e.g., with titanium dioxide, in a variety of conventional coating or composite composition systems.

For example, APs as disclosed herein can be engineered having a low oil absorption of less than about 50, and having a low surface area (measured by the BET method) of less than about 20 $m^2/g$. In an example embodiment, APs as disclosed herein have an oil absorption of less than about 50, preferably in the range of between about 10 to 40, and more preferably in the range of between about 20 to 30 (as measured according to ASTM D 281, wherein the unit of measurement is grams/100 grams) In contrast, APs made by other methods have an oil absorption of greater than about 50, and typically in the range of about 50 to 110. APs as disclosed herein also have a surface area of less than about 20 $m^2/g$, and preferably less than about 10 $m^2/g$. In an example embodiment, the surface area is in the range of between about 2 to 8 $m^2/g$, and more preferably in the range of between about 3 to 5 $m^2/g$. In contrast, APs made by conventional methods have a surface area greater than 20 $m^2/g$, e.g., from about 30 to 135 $m^2/g$.

APs as disclosed herein can be sized as needed by conventional technique depending on the particular end-use application. When used as an extender pigment, the AP may-be milled to have a particle size distribution in the range of D99 less than 8 microns and a D50 of 4 microns, preferably a D99 less than 6 microns and D50 of 4 microns, and most preferably D99 of about 4 microns and D50 of about 2 microns APs as disclosed herein are suitable for at least partially replacing titanium dioxide in coating compositions such as paints, and can be used in primers as well as in intermediate and top coats. Additionally, such APs can be further treated or processed to provide desired anti-corrosion effects, and therefore are capable of being used as an anti-corrosion agent in coating compositions used to protect metal substrates. The coating compositions for which such APs can be used include those comprising a water-based system and/or a solvent-based system and/or solventless systems.

The formulation of such coating composition systems is known in the art and generally include water or an organic solvent as a fluid, a binding agent in the form of polymer binder such as a non-volatile synthetic resins, admixtures for controlling the flow behavior and the curing, light stabilizers, preserving agents, antifoaming agents and the like, as well as pigments for adjusting the desired coloration. The exact formulations can and will vary depending on such things the type of substrate to be coated, the type of coating, the intended application method and the like. For reasons of environmental protection and because of health, safety and/or environmental concerns associated with organic solvents, water-based synthetic resin dispersions and solventless or high solids resin compositions are preferred as the binding polymer material for coating compositions Generally, water-borne coating compositions comprise four basic components: binder polymer, aqueous carrier, pigment(s) and additive(s). The binder polymer is a non-volatile resinous material that is dispersed in the aqueous carrier to form a latex. When the aqueous carrier evaporates, the binder forms a film that binds together the pigment particles and other non-volatile components of the water-borne coating composition. Water-borne paint compositions can be formulated according to the methods and components disclosed in U.S. Pat. No. 6,646,058, with or without modifications, which patent is hereby incorporated by reference in its entirety. The APs as disclosed herein can be used to formulate water-borne coating compositions as an extender pigment, alone or in combination with titanium dioxide. Other components for making a latex paint are disclosed in U.S. Pat. Nos. 6,881,782 and 4,782,109, which patents are incorporated by reference herein in their entirety.

APs made for the purpose of functioning as an extender component in a coating composition, and such coating compositions comprising the same, may be better understood with reference to the following example that is provided for purposes of reference and which is not intending to be limiting on the different coating composition formulations that can formulated to include such APs.

Example

Coating Composition Comprising AP Extender Pigment

AP particles made according to any one of the methods disclosed above were sized as noted above and used as a pigment for making a coating composition, e.g., useful as a paint. The particles can be provided and used in powder form for formulation or can be provided in liquid form, e.g., in the form of a slurry depending on the particular formulation technique. The basic formulation of the coating composition: is given in the table above, wherein the AP was used to replace up to about 40 wt % of the titanium dioxide. However, in example embodiments, coating compositions can comprise up to about 70 wt % AP, from about 5 to 60 wt % AP, and from about 30 to 50 wt % AP based on the total weight of the pigment component, e.g., displacing titanium dioxide.

As demonstrated above, embodiments of the invention provide novel methods of making AP, novel APs produced therefrom, and novel coating and composite constructions comprising such APs. While each such novel methods of making APs, APs formed thereby, and compositions comprising such APs have each been described with respect to a limited number of embodiments, the specific features of one embodiment should not be attributed to other embodiments of the invention. No single embodiment is representative of all aspects of the invention. For example, in some embodiments the methods may include numerous compounds and/or or steps not mentioned herein. Thus, variations and modifications from the described embodiments are understood to exist.

For example, the methods for making APs can result in the formation of exclusively AAP, exclusively crystalline AP, or a combination/mixture of AAP and crystalline AP. The particular form of AP produced and/or ultimately used may reflect the end-use application and the resulting desired AP characteristics and/or performance properties for such application. The thermodynamically favored AP form is crystalline (orthorhombic). The reaction proceeds through a series of intermediate structures and compositions (which are in themselves stable under ambient conditions, which are primarily amorphous in form (if they were to be isolated at that point). Only when kinetic conditions favor the more stable forms (temperature, time, concentration, and combinations thereof) do crystalline segments form from the intermediates.

Further, while specific methods have been disclosed relating to formation of the aluminum hydroxide slurry in the examples, it is to be understood that such slurry can be formed by combining aluminum hydroxide powder to water that may be heated or at temperature. If the slurry is made using heated/hot water, the temperature of the slurry can be held at such heated/hot temperature until use, e.g., until combination with the phosphoric acid. Alternatively, if the slurry is made using room temperature water, then the slurry may be heated, e.g., to the desired reaction temperature, before being combined with the phosphoric acid. Alternatively, the room temperature aluminum hydroxide slurry may be combined with the phosphoric acid at room temperature, and then the temperature of the combined slurry and phosphoric acid can be increased as desired.

The methods of making the AP are described herein as comprising a number of acts or steps, which steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A method for making solid amorphous aluminum phosphate particles by condensation reaction comprising the steps of:
    combining ingredients consisting of an aluminum hydroxide slurry containing aluminum hydroxide in water, and phosphoric acid to form a mixture; and
    reacting the mixture for a period of time to form a reaction product consisting of a dispersion of solid aluminum phosphate particles in water, wherein the solid aluminum phosphate particles comprise amorphous aluminum phosphate.

2. The method as recited in claim 1 wherein, during the step of reacting, the volume of the mixture is maintained at a constant level.

3. The method as recited in claim 1 wherein, during the step of reacting, moisture is allowed to escape.

4. The method as recited in claim 1 wherein during the step of combining, the phosphoric acid is added to the aluminum hydroxide slurry.

5. The method as recited in claim 1 wherein the slurry contains about 10 to 40 percent by weight aluminum hydroxide based on the total weight of the slurry.

6. The method as recited in claim 1 wherein during the step of combining, the aluminum hydroxide slurry is added to the phosphoric acid in a drop-wise fashion.

7. The method as recited in claim 6 wherein the slurry is added for a period of about 10 to 60 minutes.

8. The method as recited in claim 1 wherein before the step of combining, the slurry is heated to a temperature of about 30 to 95° C.

9. The method as recited in claim 8 wherein the slurry is heated to a temperature of about 65° C.

10. The method as recited in claim 1 wherein the step of reacting takes place between about 60 to 120° C.

11. The method as recited in claim 10 wherein the step of reacting takes place at about 95° C.

12. The method as recited in claim 1 further comprising the steps of:
    separating the aluminum phosphate particles from the water; and
    drying the separated aluminum phosphate particles.

13. The method as recited in claim 1 wherein the aluminum phosphate particles in the dispersion consist of solid amorphous aluminum phosphate.

14. The method as recited in claim 1 wherein the amorphous aluminum phosphate particles have an oil absorption of less than about 50 g/100 g.

15. The method as recited in claim 14 wherein the amorphous aluminum phosphate particles have a surface area of less than about 20 m$^2$/g.

16. The method as recited in claim 1 wherein the mole ratio of P:Al in the mixture is 1:1.

17. A method for making solid amorphous aluminum phosphate particles by condensation reaction comprising the steps of:
    combining ingredients consisting of an aluminum hydroxide slurry containing aluminum hydroxide in water, and phosphoric acid to form an acidic aluminum phosphate solution, and combining the acidic aluminum phosphate solution with a further amount of the aluminum hydroxide slurry to form a mixture; and
    reacting the mixture for a period of time to form a reaction product consisting of a dispersion of solid aluminum phosphate particles in water, wherein the solid aluminum phosphate particles comprise amorphous aluminum phosphate.

18. The method as recited in claim 17 wherein during the step of reacting, the volume of the mixture is maintained at a constant level.

19. The method as recited in claim 17 wherein during the step of combining the acidic aluminum phosphate solution with the further amount of the aluminum hydroxide slurry, the acidic aluminum phosphate solution is added to the further amount of the aluminum hydroxide slurry.

20. The method as recited in claim 17 wherein the slurry contains about 10 to 40 percent by weight aluminum hydroxide based on the total weight of the slurry.

21. The method as recited in claim 17 wherein the step of reacting takes place at between about 60 to 120° C.

22. The method as recited in claim 21 wherein the step of reacting takes place at about 95° C.

23. The method as recited in claim 17 further comprising, after the step of reacting:
    separating the aluminum phosphate particles from the water; and
    drying the aluminum phosphate particles.

24. The method as recited in claim 23 wherein the aluminum phosphate particles in the dispersion consist of solid amorphous aluminum phosphate.

25. The method as recited in claim 17 wherein the amorphous aluminum phosphate particles have an oil absorption of less than about 50 g/100 g, and a surface area of less than about 20 m$^2$/g.

26. The method as recited in claim 17 wherein during the reacting step the volume of the mixture is variable.

27. The method as recited in claim 17 wherein the mixture has a P:Al mole ratio of 1:1.

28. A method for making solid amorphous aluminum phosphate particles by condensation reaction comprising the steps of:
    combining ingredients consisting of an aluminum hydroxide slurry containing aluminum hydroxide in water, and phosphoric acid to form a mixture; and reacting the mixture for a period of time to form a reaction product consisting of a dispersion of aluminum phosphate particles in water solution, wherein the aluminum phosphate particles comprise amorphous aluminum phosphate, and wherein during the step of reacting, the volume of the mixture is variable by water evaporating from the mixture and water is added back to the reaction product.

29. The method as recited in claim 28 wherein during the step of reacting, the water is added to the reaction product in cycles.

30. The method as recited in claim 28 wherein the step of reacting takes place at an elevated temperature between about 60 and 120° C.

31. The method as recited in claim 30 wherein the step of reacting takes place at about 95° C.

32. The method as recited in claim 28 wherein during the step of combining, the phosphoric acid is added to the aluminum hydroxide slurry.

33. The method as recited in claim 28 wherein during the step of combining, the aluminum hydroxide slurry is added in a drop-wise fashion to the phosphoric acid.

34. The method as recited in claim 33 wherein the slurry is added for a period of about 10 minutes.

35. The method as recited in claim 28 wherein during the step of reacting, amorphous aluminum phosphate particles are formed and further amorphous aluminum phosphate particles are disposed onto the already formed amorphous aluminum phosphate particles.

36. The method as recited in claim 28 further comprising the steps of:
   separating the aluminum phosphate particles from the water; and
   drying the aluminum phosphate particles.

37. The method as recited in claim 28 wherein the aluminum phosphate particles reaction product consists of a in the dispersion consist of amorphous aluminum phosphate particles.

38. The method as recited in claim 28 wherein the amorphous aluminum phosphate particles have an oil absorption of less than about 50 g/100 g, and a surface area of less than about 20 $m^2$/g.

39. The method as recited in claim 28 wherein the mixture has a P:Al mole ratio of 1:1.

40. The method as recited in claim 28 wherein the slurry contains about 10 to 40 percent by weight aluminum hydroxide based on the total weight of the slurry.

41. A method for making amorphous aluminum phosphate particles comprising the steps of:
   combining ingredients consisting of:
   (a) an aqueous slurry of aluminum hydroxide containing aluminum hydroxide particles in water; and
   (b) phosphoric acid to form a mixture, wherein the mixture has a P:Al mole ratio of 1:1;
   reacting the mixture at a temperature between about 60 to 120° C. to form a dispersion consisting of solid aluminum phosphate particles in water, the aluminum phosphate particles comprising amorphous aluminum phosphate;
   separating out the aluminum phosphate particles from the water; and
   drying the separated aluminum phosphate particles.

42. The method as recited in claim 41 wherein the step of reacting takes place in a closed system for about 3 to 48 hours.

43. The method in claim 41 wherein during the step of reacting the system is open, moisture is allowed to escape, and water is added.

44. The method as recited in claim 41 wherein the aluminum phosphate particles consist of amorphous aluminum phosphate.

45. The method as recited in claim 41 wherein the slurry contains about 10 to 40 percent by weight aluminum hydroxide based on the total weight of the slurry.

* * * * *